(12) United States Patent
Nilsson (10) Patent No.: US 11,200,408 B2
(45) Date of Patent: Dec. 14, 2021

(54) BIOMETRIC IMAGING SYSTEM AND METHOD FOR CONTROLLING THE SYSTEM

(71) Applicant: Fingerprint Cards AB, Gothenburg (SE)

(72) Inventor: René Nilsson, Eslöv (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 16/765,735

(22) PCT Filed: Nov. 13, 2018

(86) PCT No.: PCT/SE2018/051162
§ 371 (c)(1),
(2) Date: May 20, 2020

(87) PCT Pub. No.: WO2019/108109
PCT Pub. Date: Jun. 6, 2019

(65) Prior Publication Data
US 2020/0293757 A1   Sep. 17, 2020

(30) Foreign Application Priority Data
Nov. 28, 2017  (SE) .................... 1751457-1

(51) Int. Cl.
*G06K 9/00* (2006.01)
*G06K 9/20* (2006.01)

(52) U.S. Cl.
CPC ..... *G06K 9/00288* (2013.01); *G06K 9/00255* (2013.01); *G06K 9/00604* (2013.01); *G06K 9/00617* (2013.01); *G06K 9/2027* (2013.01)

(58) Field of Classification Search
None
See application file for complete search history.

(56) References Cited

U.S. PATENT DOCUMENTS 8,649,568 B2 *  2/2014  Sato ................... G06K 9/00885
                                                        382/115
8,773,352 B1    7/2014  Huang
(Continued)

FOREIGN PATENT DOCUMENTS

WO     2015060869 A1     4/2015
WO     2017196692 A1    11/2017
WO  WO 2017/196692 A1 * 11/2017

OTHER PUBLICATIONS

PCT International Search Report and Written Opinion dated Jan. 23, 2019 for International Application No. PCT/SE2018/051162, 12 pages.

*Primary Examiner* — Edward Park
(74) *Attorney, Agent, or Firm* — RMCK Law Group, PLC (57) ABSTRACT

There is provided a biometric imaging system comprising: a display panel comprising: a plurality of display pixels controllable to form an image in the display and a plurality of individually controllable non-visible light emitting elements configured to the emit non-visible light, the non-visible light emitting elements being configured to form a controllable spatial irradiation pattern within an irradiation zone defined by the plurality of non-visible light emitting elements; and a control unit. The control unit is configured to identify a biometric object facing the display panel; determine a relative location of the biometric object in the irradiation zone; control the plurality of non-visible light emitting elements to form a spatial radiation pattern based on the location of the biometric object in relation to the display panel.

20 Claims, 5 Drawing Sheets

(56) References Cited

U.S. PATENT DOCUMENTS

| | | |
|---|---|---|
| 9,741,286 B2 | 8/2017 | Sakariya et al. |
| 2008/0074401 A1 | 3/2008 | Chung et al. |
| 2012/0299972 A1* | 11/2012 | Bae ................... G09G 3/3614 345/690 |
| 2013/0251215 A1 | 9/2013 | Coons |
| 2015/0015478 A1 | 1/2015 | Hoffman |
| 2015/0042702 A1 | 2/2015 | Jiang et al. |
| 2015/0085097 A1 | 3/2015 | Larsen |
| 2016/0085300 A1 | 3/2016 | Robbins et al. |
| 2016/0246382 A1* | 8/2016 | Alameh ................ G06F 21/32 |
| 2017/0061210 A1 | 3/2017 | Ollila |
| 2017/0064291 A1 | 3/2017 | Do et al. |
| 2017/0103276 A1 | 4/2017 | Rauhala et al. |
| 2017/0124376 A1 | 5/2017 | Wyrwas et al. |
| 2017/0332021 A1* | 11/2017 | Cui ....................... G06F 3/017 |
| 2017/0336836 A1 | 11/2017 | Mörsky et al. |
| 2017/0337413 A1* | 11/2017 | Bhat ................ G06K 9/00087 |

* cited by examiner

BIOMETRIC IMAGING SYSTEM AND METHOD FOR CONTROLLING THE SYSTEM

CROSS-REFERENCE TO RELATED APPLICATIONS

This application is a 371 U.S. National Stage of International Application No. PCT/SE2018/051162, filed Nov. 13, 2018, which claims priority to Swedish Patent Application No. 1751457-1, filed Nov. 28, 2017. The disclosures of each of the above applications are incorporated herein by reference in their entirety.

FIELD OF THE INVENTION

The present invention relates to a biometric imaging system comprising a display panel. In particular, the present invention relates to a biometric imaging system comprising a display panel adapted for face and/or iris recognition.

BACKGROUND OF THE INVENTION

Iris and Face recognition methods are becoming more common to be used as biometric verification and authentication techniques. Normally one or more separate light sources such as IR-LEDs are used to illuminate a biometric object such as the face or iris of a person, and a separate camera is used to take a picture of the object illuminated by the IR-LED light source.

Mobile consumer devices such as smartphones, tablet computers and laptops normally always including a display component and it has been suggested that the light from the displays can be used for illuminating an object to be captured by the camera.

Accordingly, IR-light from a display can be used to illuminate the face/irises of a person and the image can be detected by a camera. The possible positions of the head of a person in relation to the display and the camera for biometric verification based on face and/or irises is limited by the field of view of the camera and the possibly also by the volume which can be illuminated by the light source. The volume around the face and or/irises that is covered by the camera field of view and where image capture is possible can be referred to as the head box.

Moreover, it is possible that person may move the face/irises inside the head box. This means that the face/irises do not necessarily cover the full volume of the head box at any time and can be located in any part of the head box. In other words, sometimes the face/irises are close to the front or close to the back or in the left part or right part of the head box.

Accordingly, it is desirable to provide a biometric system capable of accurately identifying and verifying a biometric object at all positions in the head box.

SUMMARY

In view of above-mentioned and other drawbacks of the prior art, it is an object of the present invention to provide an improved biometric imaging system and a method for controlling the biometric imaging system.

According to a first aspect of the invention, there is provided a biometric imaging system comprising a display panel. The display panel in turn comprises: a plurality of display pixels controllable to form an image in the display and a plurality of individually controllable non-visible light emitting elements configured to emit non-visible light, the non-visible light emitting elements being configured to form a controllable spatial irradiation pattern within an irradiation zone defined by the plurality of non-visible light emitting elements. The biometric imaging system further comprises a control unit configured to: identify a biometric object facing the display panel; determine a relative location of the biometric object in the irradiation zone; and control the plurality of non-visible light emitting elements to form a spatial radiation pattern based on the location of the biometric object in relation to the display panel.

A display panel is in the present context interpreted to mean a display comprising all the layers and components required in presently known display technologies. The display panel comprises a pixel array where each pixel may comprise one or more light emitting elements. A pixel may for example comprise a red, green and blue light emitting region, for example represented by an individual light emitting element according to known display technologies. The individual light emitting elements or regions of a pixel may also be referred to as sub-pixels.

In optical biometric imaging systems such as in face and iris recognition systems where a biometric object in the form of the face or an eye of the user is illuminated, it is desirable to use non-visible light to illuminate the biometric object to avoid that the user is disturbed by visible light. Accordingly, the non-visible light emitting element is a light element configured to emit non-visible light, such as infrared (IR) or ultraviolet (UV) light.

The irradiation zone is the volume or region which can be sufficiently illuminated by the non-visible light emitting elements for capturing an image of the biometric object. Accordingly, the irradiation zone depends on the properties of the non-visible light emitting elements in the display panel and can be assumed to be known beforehand. The irradiation zone may also be referred to as a head box. Thereby, by determining a relative location of a biometric object within the known irradiation zone, i.e. the head box, the appropriate spatial radiation pattern for irradiating the biometric object can be formed by controlling the non-visible light emitting elements of the display panel. The spatial radiation pattern is thus a radiation pattern formed by the non-visible light emitting elements to illuminate a biometric object located somewhere in the irradiation zone.

The present invention is based on the realization that the light sources for illuminating a biometric objection in a biometric imaging system are advantageously non-visible light emitting elements integrated in the display panel, and that it is desirable to be able to control the spatial radiation pattern of the light sources to both improve the irradiation of the biometric object and to provide a more power efficient solution for irradiation of the biometric object, since only the light sources required for achieving the desired spatial radiation pattern need to be activated. Accordingly, the described system is capable of determining the location of a biometric object such as a face or an eye of a person, and to control the spatial radiation pattern of non-visible light elements in the display panel based on the determined location such that subsequent biometric verification and/or authentication is possible.

According to one embodiment of the invention, the imaging system may further comprise a camera configured to sense non-visible light, wherein the control unit is further configured to control the camera configured to sense sensing to acquire an image of the biometric object. The camera is a camera configured to detect non-visible light, i.e. IR or UV light, corresponding to the light emitted by the non-visible light emitting elements. The camera is not necessarily configured to detect only non-visible light, the camera may for example be configured to detect both UV, visible and IR light.

According to one embodiment of the invention, at least a subset of the plurality of display pixels may each comprise a non-visible light emitting element. In other words, a display pixel comprises light emitting elements configured to emit visible light and light emitting elements configured to emit non-visible light. Thereby, non-visible light emitting elements can be seamlessly integrated in display pixels and the biometric object can be illuminated directly by the display panel without the need for additional light sources outside of the display panel. Depending on e.g. the light emitting properties of the non-visible light emitting elements, the density of non-visible light emitting elements in relation to the total number of display pixels can be varied according to the requirements of different applications. The non-visible light emitting elements may also have a non-uniform distribution in the display panel. There may for example be more non-visible light emitting elements in a portion of a display more likely to be close to the biometric object. Taking a smartphone as an example application, the density of non-visible light emitting elements in the display panel may be higher in an upper portion of the display panel compared to in a lower portion.

Accordingly, in one embodiment of the invention, at least a subset of the plurality of display pixels may comprise a red, green and blue light emitting element, and a non-visible light emitting element. It is also possible to form a display panel where all of the display pixels comprise a non-visible light emitting element, which for example may simplify manufacturing and design since all of the display pixels would have the same properties. A display panel comprising a non-visible light emitting element in every display pixel can be assumed to provide the greatest flexibility in forming the spatial radiation pattern, and such a display panel can also be assumed to have the largest irradiation zone, all things equal.

According to one embodiment of the invention, a first subset of the plurality of display pixels may consist of a non-visible light emitting element, and a second subset of the plurality of display pixels may consist of a red, green and blue light emitting element. Thereby, it is possible to form a display panel where pixels consisting only of a non-visible light emitting element can be seen as taking the place of a normal display pixel. The density and distribution of such non-visible light emitting pixels can be selected based on requirements of a particular display panel.

According to one embodiment of the invention, the biometric imaging system may further comprise a second camera configured to acquire an image comprising the biometric object and to identify the biometric object in the image. The second camera may thus be a conventional camera sensitive to visible light and facing in the same direction as the display panel as commonly provided in smartphones and similar electronic devices.

According to one embodiment of the invention, the camera configured to sense non-visible light may further be configured to acquire an image comprising the biometric object and to identify the biometric object in the image. Thereby, there would be no need for a conventional camera since the IR or UV camera could be used both for identifying the location of the biometric object and to subsequently acquire an image of the biometric object based on non-visible light. It may also be advantageous to use the camera configured to sense non-visible light in low-light conditions where the irradiation zone can be illuminated and the location of the biometric object can be determined without disturbing the user.

According to one embodiment of the invention, the control unit may advantageously be configured to control the non-visible light emitting elements to form a spatial radiation pattern having a maximum intensity at the location of the biometric object. Once the relative location of the biometric object in the irradiation zone is found, it is desirable to form a spatial radiation pattern such that only the biometric object is illuminated. Thereby, the power consumption of the display panel can be minimized, which is particularly important in portable and battery powered electronic devices and if biometric imaging is performed repeatedly and frequently.

According to one embodiment of the invention, a density of non-visible light emitting elements may be higher in a first area portion of the display than in a second area portion of the display. It is also possible to form several distinct sub-areas in the display having a higher density of non-visible light emitting elements. Area portions with more non-visible light emitting elements can for example be formed in areas which can be assumed to be closest to the eyes or face of a user.

According to one embodiment of the invention, the plurality of non-visible light emitting elements may advantageously comprise light emitting elements having different radiation distributions. Thereby, an additional degree of control in forming the spatial radiation pattern is introduced. The radiation distribution of a non-visible light emitting element may for example be uniform, focused, angled etc. The different radiation distributions may be achieved by arranging an optical element in front of the light emitting element, and/or by forming a tilted light emitting element. The optical element may for example be a lens, a diffraction grating or any other optical element capable of modifying the light emission distribution.

According to one embodiment of the invention, the plurality of non-visible light emitting elements may comprise light emitting elements having a controllable radiation distribution. A controllable radiation distribution can for example be achieved by arranging a controllable optical element such as a controllable lens or grating in front of the light emitting element.

According to a second aspect of the invention, there is provided a method for controlling a biometric imaging system comprising a display panel to irradiate a biometric object. The display panel comprises a plurality of display pixels controllable to form an image in the display and a plurality of individually controllable non-visible light emitting elements configured to the emit non-visible light, the non-visible light emitting elements being configured to form a controllable spatial radiation pattern within an irradiation zone defined by the plurality of non-visible light emitting elements. The method comprises: identifying a biometric object facing the display panel; determining a relative location of the biometric object in the irradiation zone; and controlling the plurality of non-visible light emitting elements to form a spatial radiation pattern based on the location of the biometric object in relation to the display panel.

The described method can be considered to be performed by a control unit of the biometric imaging system, where the control unit is connected to and configured to control the described components of the biometric imaging system. By means of the described method, the display panel can be used to illuminate the biometric object for subsequent biometric verification.

According to one embodiment of the invention, identifying the biometric object may comprise: irradiating the irradiation zone by the non-visible light sensing elements; capturing an image comprising the biometric object by the camera configured to sense non-visible light; and identifying the biometric object in the captured image. Moreover, irradiating the irradiation zone may comprise forming an irradiation pattern by means of the non-visible light emitting elements corresponding to the irradiation zone. Accordingly, the non-visible light emitting elements can be used also in the process of acquiring an image of the biometric object with the purpose of identifying and determining the location of the biometric object in the irradiation zone. The acquired image may be used for subsequent biometric verification if the quality of the acquired image is sufficiently high. However, after identification, i.e. discovery, of the biometric object, it may be required to acquire a new image of the biometric object using a specific spatial radiation pattern based on the identified location of the biometric object in the irradiation zone.

According to one embodiment of the invention, the method may further comprise controlling the non-visible light emitting elements to form a spatial radiation pattern having a maximum irradiance at the location of the biometric object. It may also be desirable to form a spatial radiation pattern having an even irradiance across the biometric object.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging system and method according to the present invention are mainly described with reference to a biometric imaging system integrated in a smartphone. However, the described embodiments are equally well applicable for other types of electronic devices such as laptops, tablet computers and stationary terminals comprising biometric identification systems.

Figure 1:
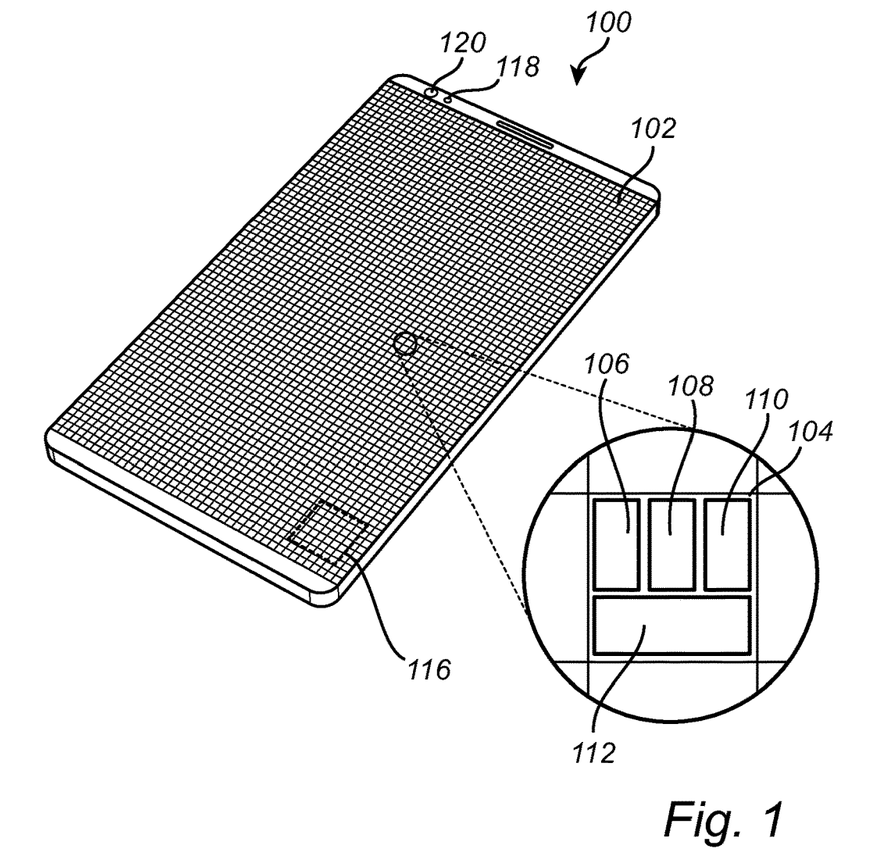
FIG. 1 schematically illustrates a biometric imaging system according to an embodiment of the invention.

FIG. 1 schematically illustrates a smartphone 100 comprising a biometric imaging system according to an embodiment of the invention. The biometric imaging system comprises a display panel 102 forming part of the smartphone 100. The display panel 102 in turn comprises a plurality of display pixels 104 arranged in a pixel array. The display pixels 104 are conventional display pixels according to any known display technology where the display pixels are controllable to form a visible image in the display.

The display panel 102 further comprises a plurality of individually controllable non-visible light emitting elements 112 configured to emit non-visible light. The non-visible light emitting elements 112 may be infrared (IR) or ultraviolet (UV) light emitting diodes.

As further exemplified in the zoomed-in portion of FIG. 1, each display pixel 104 comprises a red, green and blue (RGB) light emitting element 106, 108, 110 and a non-visible light emitting element 112. Other configurations of the display pixel 104 are possible as will be discussed in the following. The plurality of non-visible light emitting elements 112 are configured to form a controllable spatial irradiation pattern within a volume defined by the light emission properties of the plurality of non-visible light emitting elements 112.

Figure 2:
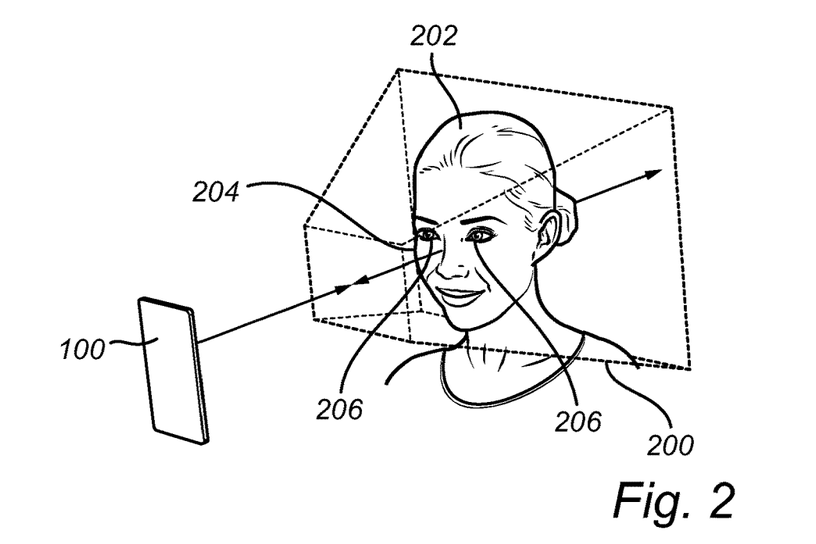
FIG. 2 schematically illustrates a feature of a biometric imaging system according to an embodiment of the invention.

FIG. 2 schematically illustrates an irradiation zone 200 where the head 202 of a person is located with in the irradiation zone 200. In a facial recognition system, the biometric object is the face 204 of the person and for iris recognition systems the biometric object is one or both of the irises 206 of the person. The irradiation zone 200 thus represents the volume in which the non-visible light emitting elements 112 are capable of irradiation a biometric object under normal conditions such that biometric identification and verification is made possible.

The biometric imaging system 100 further comprises a camera 120 configured to detect non-visible light, i.e. a camera comprising IR or UV light sensing elements such as photodiodes. The camera 120 is thus configured to capture an image of the biometric object irradiated by the non-visible light emitting elements 112 by capturing only the non-visible light reflected by the biometric object. The biometric imaging system 100 further comprises a control unit 116 configured to control the biometric imaging system 100.

The control unit 116 may include a microprocessor, microcontroller, programmable digital signal processor or another programmable device. The control unit 116 may also, or instead, include an application specific integrated circuit, a programmable gate array or programmable array logic, a programmable logic device, or a digital signal processor. Where the control unit 116 includes a programmable device such as the microprocessor, microcontroller or programmable digital signal processor mentioned above, the processor may further include computer executable code that controls operation of the programmable device.

The functionality of the control unit 116 may also be integrated in a control unit used for controlling the display panel 102 or other features of the smartphone 100.

Figure 3:
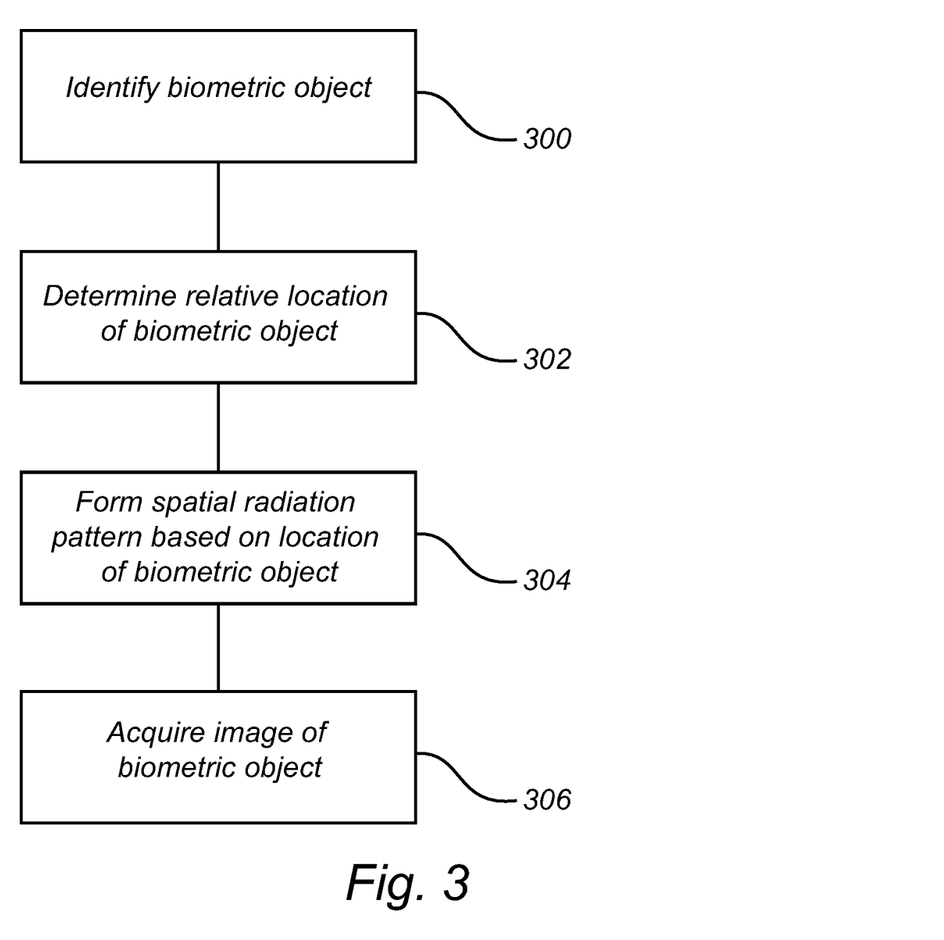
FIG. 3 is a flow chart outlining general steps of a method according to an embodiment of the invention.

The control unit 116 is configured to perform steps of a method according to embodiments of the invention which will be described with reference to the flow chart of FIG. 3 outlining the general steps of an exemplifying method. First, a biometric object 204, 206 facing the display panel is identified 300. A biometric object in the form of a face 204 or an iris 206 may be identified by capturing an image using a second camera 118 and identifying the biometric object in the image. It should be noted that identifying 300 the biometric object 204, 206 may also be performed without permanently storing an actual image of the user. The second camera 118 may be a conventional camera 118 of the smartphone used to identify the biometric object using known image processing methods. It is also possible to provide a camera module or camera unit having the combined functionality of capturing one or both non-visible (IR and/or UV) light and visible light.

Once the biometric object 204, 206 has been identified, the relative location of the biometric object 204, 206 within the irradiation zone 200 can be determined 302 based on known information of the camera location and camera view in relation to an effective irradiation zone 200.

Thereby, the plurality of non-visible light emitting elements can be controlled 304 to form a spatial radiation pattern based on the location of the biometric object 204, 206 in relation to the display panel 102.

Figure 4:
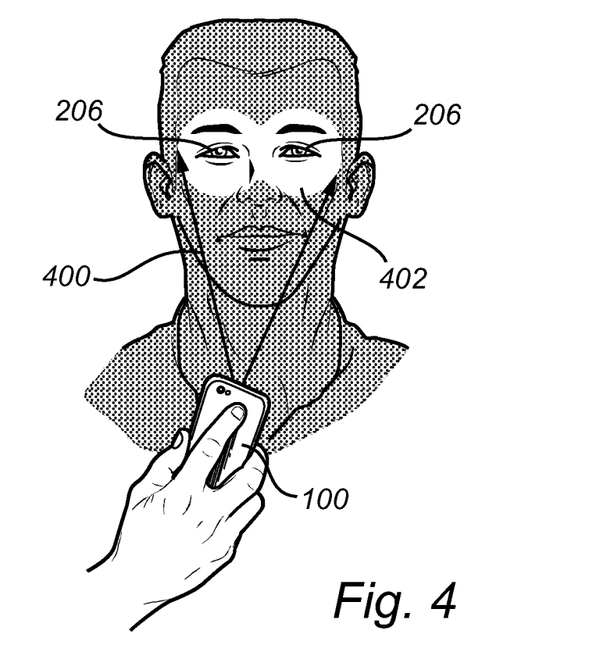
FIG. 4 schematically illustrates a feature of a biometric imaging system according to an embodiment of the invention FIGS. 5A-B schematically illustrate example embodiments of a biometric imaging system according to an embodiment of the invention FIG. 6 schematically illustrates a portion of a biometric imaging system according to an embodiment of the invention FIGS. 7A-E schematically illustrate features of a biometric imaging system according to an embodiment of the invention FIGS. 8A-B schematically illustrate features of a biometric imaging system according to an embodiment of the invention.

An example irradiation pattern 400 is illustrated in FIG. 4 where only an eye region 402 of the user is irradiated in order to irradiate the irises 206 of the user. Preferably, the irradiation pattern 400, which may also be referred to as the irradiation distribution, is controlled so that the maximum irradiation is located at the biometric object 206, and it is also preferable that the irradiation is even across the area of the biometric object 206.

With the biometric object 204, 206 being irradiated by non-visible light, an image of the biometric object 204, 206 is acquired by the camera 120 configured to sense non-visible light for subsequent biometric verification. The camera 118 configured to sense non-visible light may be arranged as a separate IR/UV camera 118 arranged outside of the display panel 102 as illustrated in FIG. 1.

Figure 5A:
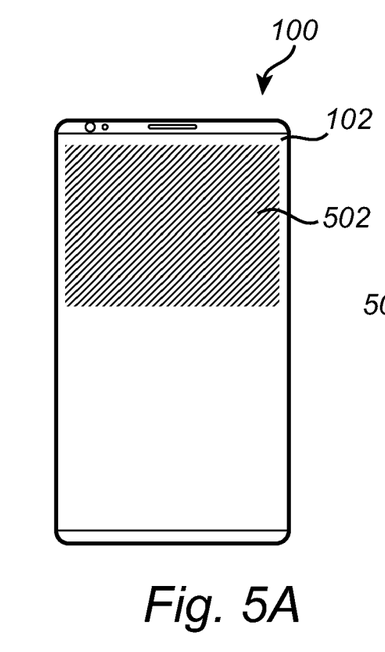
Figure 5B:
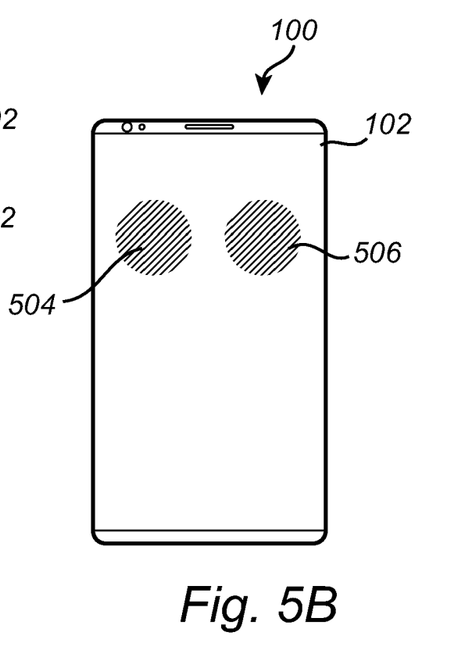

FIGS. 5A and 5B illustrate embodiments where only selected portions 502, 504, 506 of the display panel 102 comprise non-visible light emitting elements 112. Here, the non-visible light emitting elements 112 are located in areas of the display panel 102 assumed to be closest to the biometric object 204, 206 during normal use of the smartphone 100. In FIG. 5A, a rectangular upper portion 502 of the display panel comprises non-visible light emitting elements 112 and in FIG. 5B two substantially circular portions 504, 506 are considered to comprise non-visible light emitting elements 112. The two substantially circular portions 504, 506 can be assumed to approximately correspond to the location of the eyes of the user in a normal use case.

Figure 6:
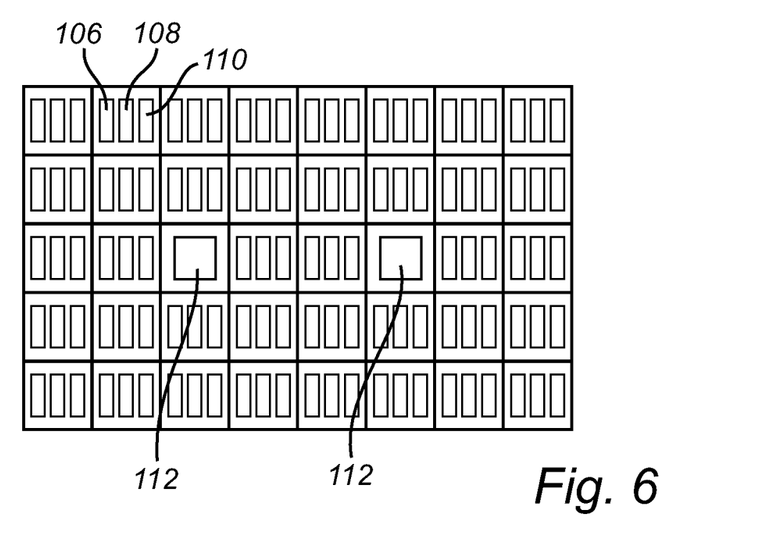

The non-visible light emitting elements 112 may be integrated in a display pixel 104 as illustrated in FIG. 1. It is also possible to provide a display panel where non-visible light emitting elements 112 are arranged as individual pixels in the pixel array, taking the place of an RGB pixel, as illustrated in FIG. 6.

Figure 7A:
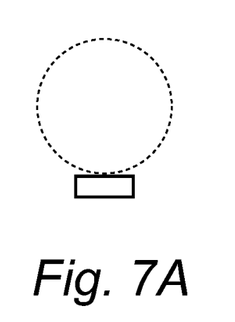
Figure 7B:
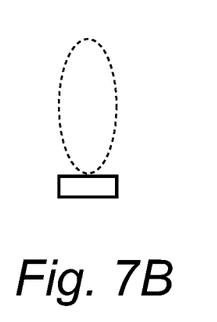
Figure 7C:
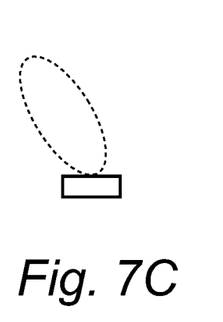
Figure 7D:
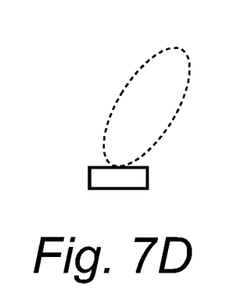
Figure 7E:
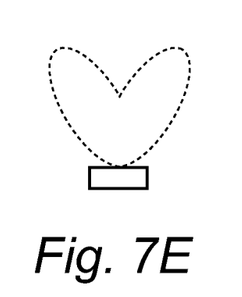

FIGS. 7A-E schematically illustrate example emission distributions of non-visible light emitting elements 112. In FIG. 7A, the non-visible light emitting element 112 exhibits a uniform Lambertian emission distribution, FIGS. 7B-D illustrate parabolic emission patterns which are straight, FIG. 7B and tilted, FIG. 7C,D, and FIG. 7E illustrates an emission pattern comprising two emission lobes. The distributions illustrated in FIG. 7C-E may be oriented at an angle to an xy-plane defined by the surface of the display panel 102 with respect to one or both of the x- and y-axis. The illustrated distributions can for example be achieved by arranging microlenses or other optical elements between the light emission element and a cover glass of the display panel 102. The light emitting elements may also be tilted to achieve the described angled distributions.

Moreover, the non-visible light emitting elements 112 may be provided in the form of LEDs (light emitting diodes) or VCSELs (vertical cavity surface emitting lasers).

By means of a suitable distribution and combination of the above described non-visible light emitting elements 112, either as individual display pixel elements or as light emitting elements integrated in RGB-pixels of the display panel 102 a controllable spatial radiation pattern can be achieved, i.e. the size, shape and orientation of the spatial radiation pattern can be controlled by controlling which of the non-visible light emitting elements 112 to activate and possibly also by controlling the light distribution of individually controllable non-visible light emitting elements 112.

Figures 8A, 8B:
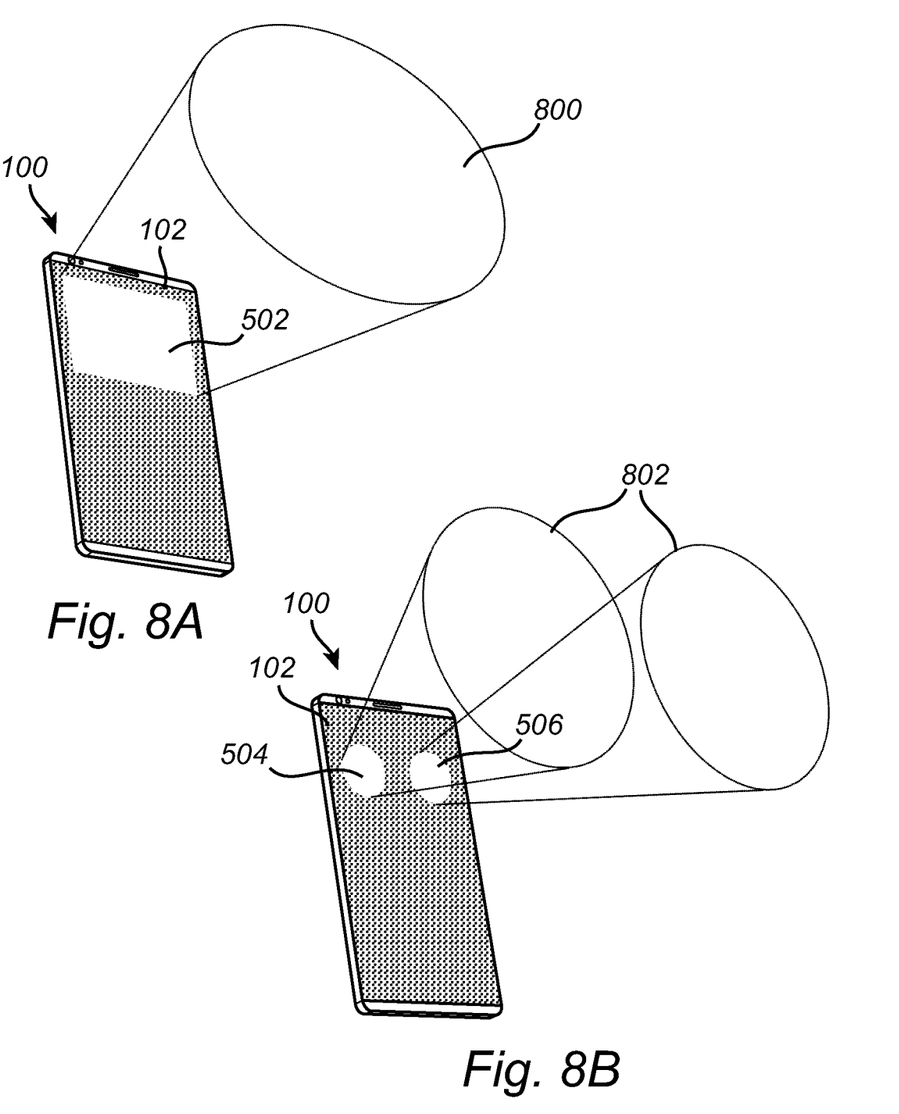

FIGS. 8A and 8B schematically illustrate example configurations of spatial radiation patterns based on the distributions 502, 504, 506 of non-visible light emitting elements 112 illustrated in FIG. 5A-B. In FIG. 8A, a spatial radiation pattern 800 suitable for irradiating a face of person is illustrated and FIG. 8B illustrates a spatial radiation pattern 802 suitable for irradiating a face of person. In summary, a controllable spatial irradiation pattern is achieved by determining which of the non-visible light emitting elements to activate, by controlling the emission direction of selected non-visible light emitting elements 112, or by a combination thereof.

It should be noted that the non-visible light emitting elements 112 may be arranged and distributed in many different ways in the display panel 102 as long as the desired spatial radiation pattern can be achieved.

Moreover, the described embodiments are applicable for a display panel based on any known display technology such as LED, OLED, uLED and the like.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A biometric imaging system comprising:
a display panel comprising: a plurality of display pixels controllable to form an image in the display and a plurality of individually controllable non-visible light emitting elements configured to emit non-visible light, the non-visible light emitting elements being further configured to form a controllable spatial irradiation pattern within an irradiation zone defined by the plurality of non-visible light emitting elements, wherein at least a subset of the plurality of display pixels each comprise a non-visible light emitting element; and
a control unit configured to:
identify a biometric object facing the display panel;
determine a relative location of the biometric object in the irradiation zone in relation to the display panel;
control the plurality of non-visible light emitting elements to form a spatial radiation pattern based on the location of the biometric object in relation to the display panel, and
control the non-visible light emitting elements to form a spatial radiation pattern having a maximum intensity at the location of the biometric object.

2. The biometric imaging system according to claim 1, further comprising a camera sensitive to non-visible light, wherein the control unit is further configured to control the camera to acquire an image of the biometric object.

3. The biometric imaging system according to claim 2, wherein the camera configured to sense non-visible light is further configured to acquire an image comprising the biometric object and to identify the biometric object in the image.

4. The biometric imaging system according to claim 1, wherein at least a subset of the plurality of display pixels comprises a red, green and blue light emitting element, and a non-visible light emitting element.

5. The biometric imaging system according to claim 1, wherein a first subset of the plurality of display pixels consists of a non-visible light emitting element, and wherein a second subset of the plurality of display pixels consists of a red, green and blue light emitting element.

6. The biometric imaging system according to claim 1, further comprising a camera configured to acquire an image comprising the biometric object and to identify the biometric object in the image.

7. The biometric imaging system according to claim 1, wherein the plurality of non-visible light emitting elements comprises light emitting elements having different radiation distributions.

8. The biometric imaging system according to claim 1, wherein the plurality of non-visible light emitting elements comprises light emitting elements having a controllable radiation distribution.

9. The biometric imaging system according to claim 1, wherein the non-visible light emitting elements are infrared, IR, light emitting elements or ultraviolet, UV, light emitting elements.

10. A method for controlling a biometric imaging system comprising a display panel to irradiate a biometric object, the display panel comprising: a plurality of display pixels controllable to form an image in the display and a plurality of individually controllable non-visible light emitting elements configured to emit non-visible light, wherein at least a subset of the plurality of display pixels each comprise a non-visible light emitting element, the non-visible light emitting elements being configured to form a controllable spatial radiation pattern within an irradiation zone defined by the plurality of non-visible light emitting elements;
the method comprising:
identifying a biometric object facing the display panel;
determining a relative location of the biometric object in the irradiation zone in relation to the display panel; and
controlling the plurality of non-visible light emitting elements to form a spatial radiation pattern based on the location of the biometric object in relation to the display panel,
wherein controlling the non-visible light emitting elements to form a spatial radiation pattern comprises activating only a portion of the plurality of non-visible light emitting elements, and
wherein the portion of activated non-visible light emitting elements are located in a portion of the display located nearest to the location of the biometric object.

11. The method according to claim 10, further comprising, in a system comprising a camera configured to sense non-visible light, acquiring an image of the biometric object by the camera.

12. The method according to claim 10, wherein identifying the biometric object comprises:
irradiating the irradiation zone by the non-visible light sensing elements;
capturing an image comprising the biometric object by the camera configured to sense non-visible light; and
identifying the biometric object in the captured image.

13. The method according to claim 12, wherein irradiating the irradiation zone comprises forming an irradiation pattern by means of the non-visible light emitting elements corresponding to the irradiation zone.

14. The method according to claim 10, further comprising controlling the non-visible light emitting elements to form a spatial radiation pattern having a maximum irradiance at the location of the biometric object.

15. The method according to claim 10, further comprising controlling the non-visible light emitting elements to form a spatial radiation pattern having an even irradiance across the biometric object.

16. The method according to claim 10, further comprising controlling an angular light distribution of an individual non-visible light emitting element.

17. A biometric imaging system comprising:
a display panel comprising: a plurality of display pixels controllable to form an image in the display and a plurality of individually controllable non-visible light emitting elements configured to emit non-visible light, the non-visible light emitting elements being further configured to form a controllable spatial irradiation pattern within an irradiation zone defined by the plurality of non-visible light emitting elements, wherein at least a subset of the plurality of display pixels each comprise a non-visible light emitting element; and
a control unit configured to:
identify a biometric object facing the display panel;
determine a relative location of the biometric object in the irradiation zone in relation to the display panel; and
control the plurality of non-visible light emitting elements to form a spatial radiation pattern based on the location of the biometric object in relation to the display panel, wherein a density of non-visible light emitting elements is higher in a first area portion of the display than in a second area portion of the display.

18. The biometric imaging system according to claim 17, further comprising a camera sensitive to non-visible light, wherein the control unit is further configured to control the camera to acquire an image of the biometric object.

19. The biometric imaging system according to claim 17, wherein at least a subset of the plurality of display pixels comprises a red, green and blue light emitting element, and a non-visible light emitting element.

20. The biometric imaging system according to claim 17, wherein a first subset of the plurality of display pixels consists of a non-visible light emitting element, and wherein a second subset of the plurality of display pixels consists of a red, green and blue light emitting element.

* * * * *